United States Patent [19]

Takeuchi et al.

[11] Patent Number: 4,694,680
[45] Date of Patent: Sep. 22, 1987

[54] ULTRASOUND DIAGNOSTIC EQUIPMENT

[75] Inventors: Yasuhito Takeuchi; Yuichi Hirota; Shinichi Sano; Shinichi Ishiguro, all of Tokyo, Japan

[73] Assignee: Yokogawa Medical Systems, Limited, Tokyo, Japan

[21] Appl. No.: 765,435

[22] PCT Filed: Dec. 26, 1984

[86] PCT No.: PCT/JP84/00615

§ 371 Date: Jul. 26, 1985

§ 102(e) Date: Jul. 26, 1985

[87] PCT Pub. No.: WO85/02761

PCT Pub. Date: Jul. 4, 1985

[30] Foreign Application Priority Data

Dec. 27, 1983 [JP] Japan ................................ 58-247382

[51] Int. Cl.$^4$ ........................................... G01N 29/00
[52] U.S. Cl. .................................... 73/1 DV; 367/13; 128/660
[58] Field of Search ........................ 73/1 DV; 367/13; 128/660

[56] References Cited

U.S. PATENT DOCUMENTS

| 4,043,175 | 8/1977  | Fredriksson et al. | 73/1 DV |
| 4,233,677 | 11/1980 | Brown et al.      | 73/1 DV |
| 4,366,561 | 12/1982 | Klein             | 73/1 DV |
| 4,445,206 | 4/1984  | Avdenard          | 73/1 DV |
| 4,545,251 | 10/1985 | Uchida et al.     | 73/1 DV |
| 4,594,692 | 6/1986  | Read              | 73/1 DV |

Primary Examiner—Howard A. Birmiel
Attorney, Agent, or Firm—Moonray Kojima

[57] ABSTRACT

The equipment in this invention provided with an internal signal checking means configured in a combined use with signal processing and display means commonly furnished to an ultrasound diagnostic equipment stores various internal signals and in said equipment by selectively inputting them through a multiplexer into a video memory also used for receive echo signal storage, and said internal signals stored are displayed on a screen of a display means of said equipment as an image or they are evaluated by a processor in said equipment to perform internal signal checking.

5 Claims, 2 Drawing Figures

ULTRASOUND DIAGNOSTIC EQUIPMENT

TECHNICAL FIELD

This inventions relates to an ultrasound diagnostic equipment with an internal signal checking means.

BACKGROUND ART

In an ultrasound diagnostic equipment, it is required to check whether or not each section thereof operates normally through use of internal signal measurement.

Namely, it is required to check power circuit operation of the DC power supply voltage and ripple measurements, and also to check time gain control (TGC) and receive filter time frequency control (TFC) operations through TGC signal and TFC signal measurements, respectively.

So far, the measurement of internal signals in the conventional ultrasound diagnostic device has been performed using various conventional measuring instruments for signal measurements.

Therefore, it was required for the operator to acquire capability for handling various measuring instruments and for evaluating the measured results.

DISCLOSURE OF THE INVENTION

This invention aims to overcome such disadvantages aforementioned and to provide an ultrasound diagnostic equipment furnished with an internal signal checking circuit configured in a combined use with signal processing and display means in the ultrasound diagnostic equipment.

For the accomplishment of this purpose, in this invention there is provided a video memory means to store receive echo signals wherein internal testing signals are also stored by selectively inputting internal testing signals into the video memory means through a multiplexer to check internal testing signals stored therein by displaying them on a image display means of the ultrasound diagnostic equipment as an image or by evaluating them using a processor.

BEST MODE FOR CARRYING OUT THE INVENTION

Figure 1:
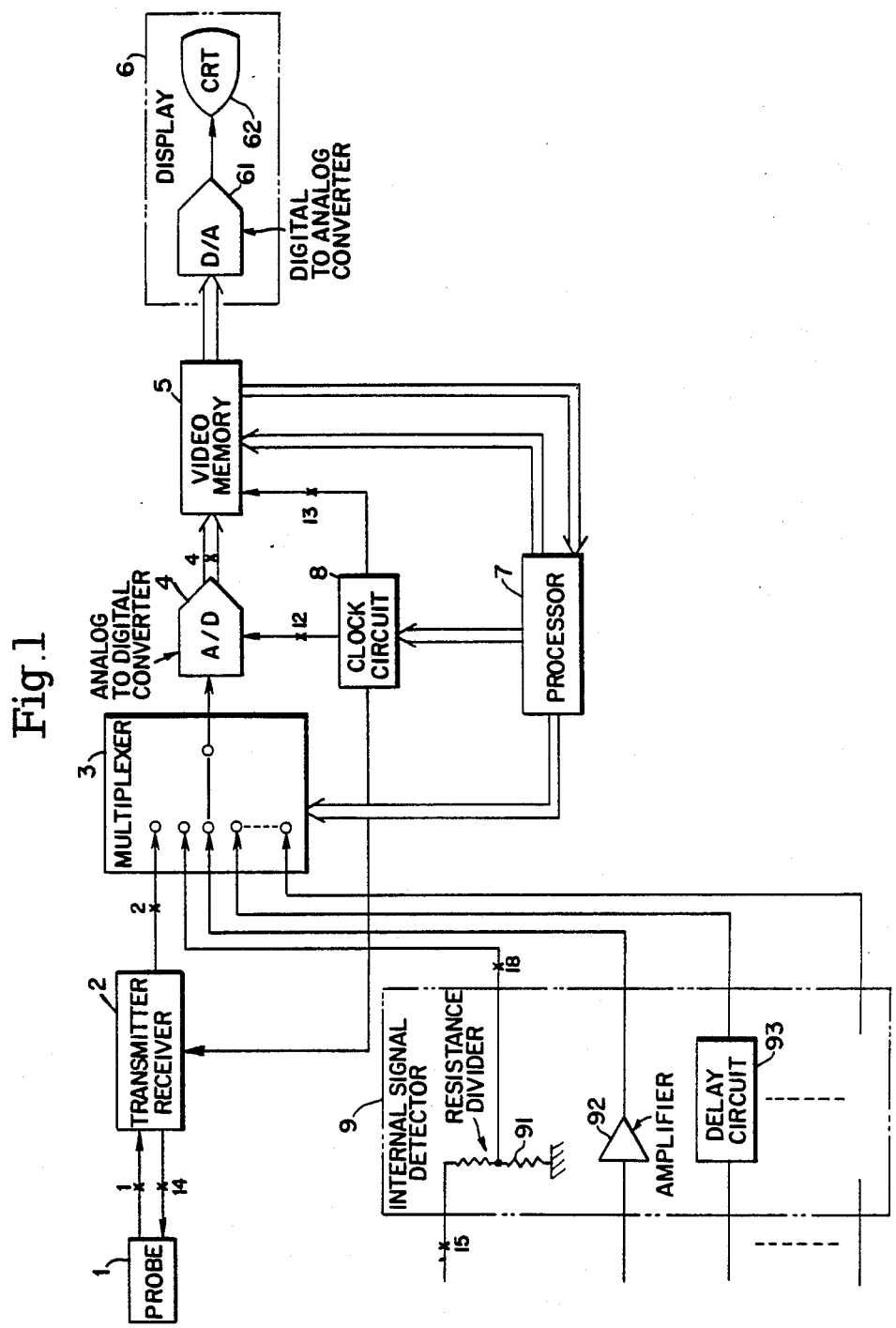
FIG. 1 shows a block diagram showing the configuration of the embodiment of this invention.

Referring to FIG. 1, an illustrative embodiment of this invention consists of an ultrasound probe 1, transmitter receiver 2, multiplexer 3, analog-to-digital converter (hereinafter called A/D converter) 4, video memory 5, display 6, processor (hereinafter called CPU) 7, clock generator (hereinafter called clock circuit) 8 and internal signal detector 9.

The transmitter receiver 2 is provided with a transmit circuit and a receive circuit; the display 6 is provided with a digital-to-analog conversion circuit (hereinafter called D/A converter) 61 and image display tube (hereinafter called CRT) 62; and the internal signal detector 9 is provided with signal conditioners comprising one or more resistance divider(s) 91, amplifier(s) 92 and delay circuit(s) 93. The type and the number of signal conditioners correspond to type and number of internal signals.

The output of the transmit circuit in the transmitter receiver 2 to connect to the ultrasound probe 1; the output of the ultrasound probe 1 to connect to the input of the receive circuit in the transmitter receiver 2; and the output of the receive circuit in the transmitter receiver 2 to connect to the first data input of the multiplexer 3.

On the other hand, the inputs internal signal detector 9 to connect to the measured points within the ultrasound diagnostic equipment.

The outputs of the internal signal detector 9 are connected to the respective data inputs of the multiplexer 3.

The data output of the multiplexer 3 to connect to the input of the A/D converter 4; the output of the A/D converter 4 to connect to the data input of the video memory 5; the first data output of the video memory 5 to connect to the input of the D/A converter 61 in the display 6; and the output of the D/A converter 61 to connect to the input of the CRT 62. Further, the second data output of the video memory 5 to connect to the input of the CPU 7.

The first output of the clock circuit 8 to connect to the clock signal input of the transmitter receiver 2; the second output of the clock circuit 8 to connect to the clock signal input of the A/D converter 4; and the third output of the clock circuit 8 to connect to the clock signal input of the video memory 5. Further, the first output of the CPU 7 to connect to the control signal input of the multiplexer 3; the second output of the CPU 7 to connect to the control signal input of the clock circuit 8; and the third output of the CPU 7 to connect to the address signal input of the video memory 5.

In such a configuration, a conventional ultrasound diagnostic equipment comprises the output of the transmitter receiver 2 directly fed to the A/D converter without the multiplexer 3, internal signal detector 9, the control signal path from the CPU 7 to the multiplexer 3 and the data path from the video memory 5 to the processor 7.

The features of this invention are that the internal signal detector 9 and multiplexer 3 are added to the configuration of the conventional ultrasound diagnostic equipment with the respective connections; the CPU 7 is connected to the video memory 5 via a data bus; and the CPU reads the value stored in the video memory 5 for evaluation.

Following is a description of the operation of the embodiment of this invention.

The embodiment of this invention operates in (1) a normal operation mode and (2) an internal signal check mode. In the normal operation mode, the CRT 62 displays the diagnostic image of a measured body on its screen in accordance with echo signals detected by the ultrasound probe 1.

In the internal signal check mode, the internal test condition is evaluated or signal display is made on the screen of the CRT 62 by the CPU 7 in accordance with the signal of each section being tested in the ultrasound diagnostic equipment.

Figure 2:
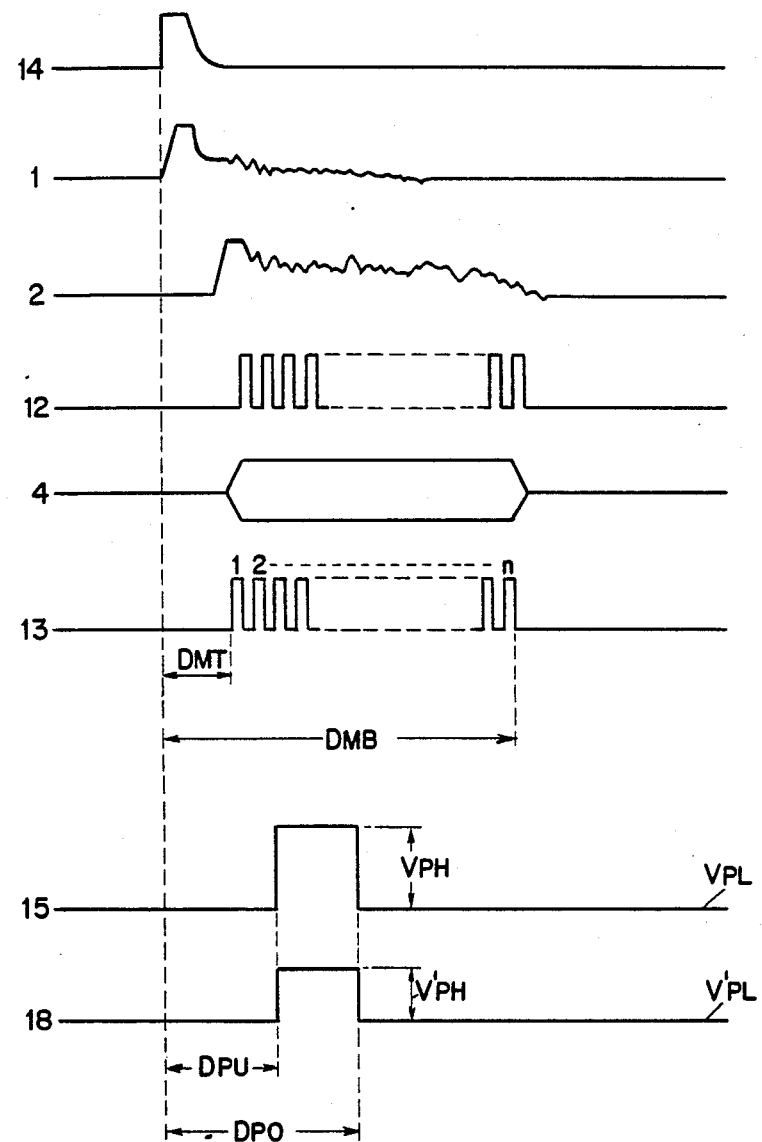
FIG. 2 shows a time chart of explaining the operation of the equipment in FIG. 1.

In the following description, in addition to FIG. 1, FIG. 2 is referred to as showing the timing of one acoustic scanning line of an ultrasound image.

Numbers 1, 2, 4, 12, 13, 14, 15 and 18 in FIG. 2 show waveforms at portions marked with X with numbers 1, 2, 4, 13, 14, 15 and 18 in FIG. 1, respectively.

Following is the operational description in the normal operation mode. In this mode, the output of the receive circuit in the transmitter receiver 2 is selected by the multiplexer 3 under the control of the CPU 7. The transmit circuit in the transmitter receiver 2 transmits a pulse signal to drive transducers in the ultrasound probe 1; a receive signal 1 from the ultrasound probe 1 is fed to the receive circuit in the transmitter receiver 2 wherein amplification and delay processing are performed; and the signal is converted to a digital signal by the A/D converter to be written in the video memory 5. Write timing is given by a timing clock 13. Namely, as shown in FIG. 2, assuming that rise of the drive pulse 14 is set to the base line on the time axis, the digital signal 4 existing between the time after the lapse of DMT from the origin and that after the lapse of DMB from the same origin is written in the video memory 5. The drive pulse 14 is outputted every time each acoustic scanning line is switched and each echo signal corresponding to said pulse is received and processed to be stored in the video memory 5. When the acoustic scanning line has scanned the whole area of a field of probe vision, the video memory 5 is stored with the image data corresponding to one frame. The read output of the video memory 5 is converted to an analog video signal by the D/A converter to be then displayed on the screen of the CRT 62.

Following is the operational description in the internal signal check mode. In this mode, an output signal from the internal signal detector 9 is selected by the multiplexer 3. In the internal signal detector 9, the voltage of a certain signal obtained at each point being tested in the ultrasound diagnostic equipment is divided or amplified by the resistance divider 91 or the amplifier 9 so that it is within the conversion voltage range of the A/D converter 4, while a certain signal at each point in the equipment is delayed by the delay circuit 93 so that its rise and fall are within the operating cycle (DMB-DMT) of the A/D converter 4.

During the internal signal check mode, the ultrasound diagnostic equipment continues its normal operation. Therefore, the internal signals corresponding to one sequence per acoustic scanning line are outputted from the internal signal detector 9, and one internal signal selected by the multiplexer 3 is digitized by the A/D converter in the same way as the receive signals corresponding to one acoustic scanning line of the ultrasound probe 1 to be written in the video memory 5. Thus, an internal signal is stored in the video memory 5 by one sequence.

If the multiplexer 3 is switched synchronously with acoustic scanning line selection, the output signals of more than one are sequentially written in the video memory by those corresponding to one acoustic scanning line. When all of the output signals of the internal signal detector 9 have been written, the CPU7 stops temporarily its acoustic scan and during this stopped period, each internal signal stored in the video memory 5 is read by the address signal, and is analyzed to evaluate the presence or absence of fault. Alternatively or concurrently the waveform corresponding to each internal signal stored in the video memory 5 is displayed on the screen of the CRT 62 to enable the operator to evaluate the presence or absence of the fault in comparison of the displayed waveform with a normal waveform sample.

In the internal signal check mode if the state of an internal signal selected by the multiplexer 3 continues while the acoustic scanning line scans the whole field of vision of said probe, all of the acoustic scanning line in one frame corresponding to the same internal signals are stored in the video memory 5. Thus, the contents of the video memory 5 are converted to analog video signals by the D/A converter 61 to display them on the screen of the CRT 62. As a result, a striped pattern in light and shade according to internal signal waveforms is so created that the operator can evaluate the presence or absence of fault based on this pattern.

CAPABILITY OF EXPLOITATION IN INDUSTRY

The invention, as aforementioned, can check correctness or incorrectness, ripple content and waveform of various sections of the equipment such as each power supply voltage, and the output waveforms of the TGC and TFC circuits as examples from among factors exerting a harmful influence upon image creation on an ultrasound diagnostic equipment using built-in measuring and analyzing circuits. Thus skilled capability is not needed when checking is performed by the use of the inventive special measuring instruments. Therefore, it is easy for the operator to diagnose the ultrasound diagnostic equipment itself to keep the equipment always in its best condition. In addition, the equipment of this invention comprises simple, ordinary circuits for internal signal checking.

I claim:
1. An ultrasound diagnostic equipment comprising
    an ultrasound applying probe means for applying ultrasound signals to a body to be examined;
    control means;
    means, under the control of said control means, for receiving diagnostic signals from said body and for outputting in response thereto transmitted diagnostic signals;
    testing means for testing faults in the internal components of said equipment, comprising means for providing test signals indicating presence or absence of faults in said internal components of said equipment;
    switching means for selectively inputting test signals from said testing means and diagnostic signals from said means for receiving and selectively outputting said test signals and said diagnostic signals;
    converting means, under the control of said control means, for inputting signals from said switching means and for converting said test signals and said diagnostic signals into digital signals;
    memory means, under control of said control means, for storing digital signals from said converting means; and
    display means for inputting signals stored in said memory means and displaying said signals; wherein
    said testing means comprises dividing means, amplifier means and delay means, and means for testing the internal components of said equipment for faults and applying test signals through said switching means to said converting means concurrently with the continued operation of said ultrasound applying probe means; and wherein
    said dividing means and said amplifier means of said testing means causes the voltage of the test signals to be within the voltage range of the converting means and said delay means cause the test signals to be within the operating cycle of the converting means.
2. The equipment as claimed in claim 1 wherein said memory means comprises a digital video memory.

3. The equipment as claimed in claim 2 further comprising: a data processing means which reads the output signal from the testing means stored in said video memory to evaluate the presence or absence of fault.

4. The equipment as claimed in claim 2 further comprising a data processing means which reads the output signal from the testing means as stored in said video memory to display said signal on said display means as an analog waveform signal.

5. The equipment as claimed in claim 1 wherein said switching means comprises a multiplexer, wherein said multiplexer continues a selected state of an output signal from said testing means until said output signal at least corresponding to one frame of a display screen is stored in said video memory.

* * * * *